United States Patent [19]
Emambakhsh et al.

[11] Patent Number: 5,588,668
[45] Date of Patent: Dec. 31, 1996

[54] AIR BAG MODULE

[75] Inventors: Ali S. Emambakhsh, Rochester Hills; Russell E. Stein, Leonard, both of Mich.

[73] Assignee: TRW Vehicle Safety Systems Inc., Lyndhurst, Ohio

[21] Appl. No.: 452,124

[22] Filed: May 26, 1995

[51] Int. Cl.$^6$ .................................................. B60R 21/16
[52] U.S. Cl. ...................................... 280/728.2; 280/732
[58] Field of Search .............................. 280/728.1, 728.2, 280/731, 732

[56] References Cited

U.S. PATENT DOCUMENTS

| | | | |
|---|---|---|---|
| 4,915,410 | 4/1990 | Bachelder | 280/732 |
| 5,209,519 | 5/1993 | Shiga et al. | 280/728.2 |
| 5,320,380 | 6/1994 | Hamada et al. | 280/728.3 |
| 5,346,248 | 9/1994 | Rhein et al. | 280/732 |
| 5,398,968 | 3/1995 | Emambakhsh et al. | 280/743.1 |
| 5,462,305 | 10/1995 | Hamada | 280/728.2 |
| 5,490,690 | 2/1996 | Mihm | 280/728.2 |

OTHER PUBLICATIONS

U.S. Patent Appln. Serial No. 08/395,924, filed Feb. 28, 1995, entitled "Attachment Structure for use in an Inflatable Vehicle Occupant Restraint System".

Primary Examiner—Paul N. Dickson
Attorney, Agent, or Firm—Tarolli, Sundheim, Covell, Tummino & Szabo

[57] ABSTRACT

An air bag module (10) includes an air bag (14) and an inflator (18). A canister (16) defines a chamber (42) for receiving a housing (190) of the inflator (18). Each one of a pair of straps (20, 22) has an upper end portion (202, 222) located in a first recessed portion (70, 72) on a first upper flange (50) of the canister (16). Each strap (20, 22) has a lower end portion (204, 224) located in a first recessed portion (130, 132) on a first lower flange (110) of the canister (16). The canister (16) has a plurality of second recessed portions (170, 172) forming standoffs which project into the chamber (42) for engaging spaced surface portions (194, 196) of the inflator housing (190). The straps (20, 22) clamp the inflator housing (190) against the second recessed portions (170, 172) of the canister (16).

20 Claims, 3 Drawing Sheets

AIR BAG MODULE

BACKGROUND OF THE INVENTION

1. Technical Field

The present invention relates to a vehicle safety apparatus, and, in particular, to an air bag module including an inflatable vehicle occupant restraint, such as an air bag, for protecting an occupant of a vehicle.

2. Description of the Prior Art

An air bag for protecting a front seat passenger of a vehicle commonly is mounted in the instrument panel of the vehicle. The air bag is stored in a deflated, folded condition, together with an inflator, in the vehicle instrument panel. In the event of a vehicle emergency situation requiring inflation of the air bag to help protect the vehicle occupant, such as sudden vehicle deceleration exceeding a predetermined deceleration, the inflator is actuated to inflate the air bag into a position to protect the vehicle occupant.

SUMMARY OF THE INVENTION

The present invention is a safety apparatus for protecting an occupant of a vehicle. The apparatus includes an inflatable vehicle occupant restraint having a deflated condition and an inflated, occupant protecting condition. The apparatus further includes an inflator for inflating the inflatable restraint. The inflator has a housing. The apparatus also includes a canister defining a chamber for receiving the housing.

The canister has upper and lower main wall portions and has first upper and lower flanges projecting away from the upper and lower main wall portions, respectively, and away from each other. Each one of the first upper and lower flanges has a pair of first recessed portions. The canister has a plurality of second recessed portions forming standoffs which project into the chamber and which define spaced surfaces for engaging spaced surface portions of the housing.

The safety apparatus further includes a pair of straps. Each one of the straps has an upper end located in one of the first recessed portions on the first upper flange and a lower end located in one of the first recessed portions on the first lower flange. The straps clamp against the inflator housing to clamp the surface portions of the inflator housing against the surfaces on the standoffs. Fasteners located in the first recessed portions secure the straps to the canister.

In a preferred embodiment, the safety apparatus also includes a unitary structure defining a chamber in which the inflatable restraint is located when in the deflated condition. The unitary structure includes a deployment door which opens as the inflatable restraint is inflated to enable the inflatable restraint to move into the inflated, occupant protecting condition. The unitary structure has second upper and lower flanges which overlie the first upper and lower flanges on the canister. Fastener means secures the second upper and lower flanges to the first upper and lower flanges.

BRIEF DESCRIPTION OF THE DRAWINGS

The foregoing and other features of the present invention will become apparent to one of ordinary skill in the art to which the present invention relates upon consideration of the following description of the invention with reference to the accompanying drawings, wherein.

DESCRIPTION OF A PREFERRED EMBODIMENT

Figure 1:
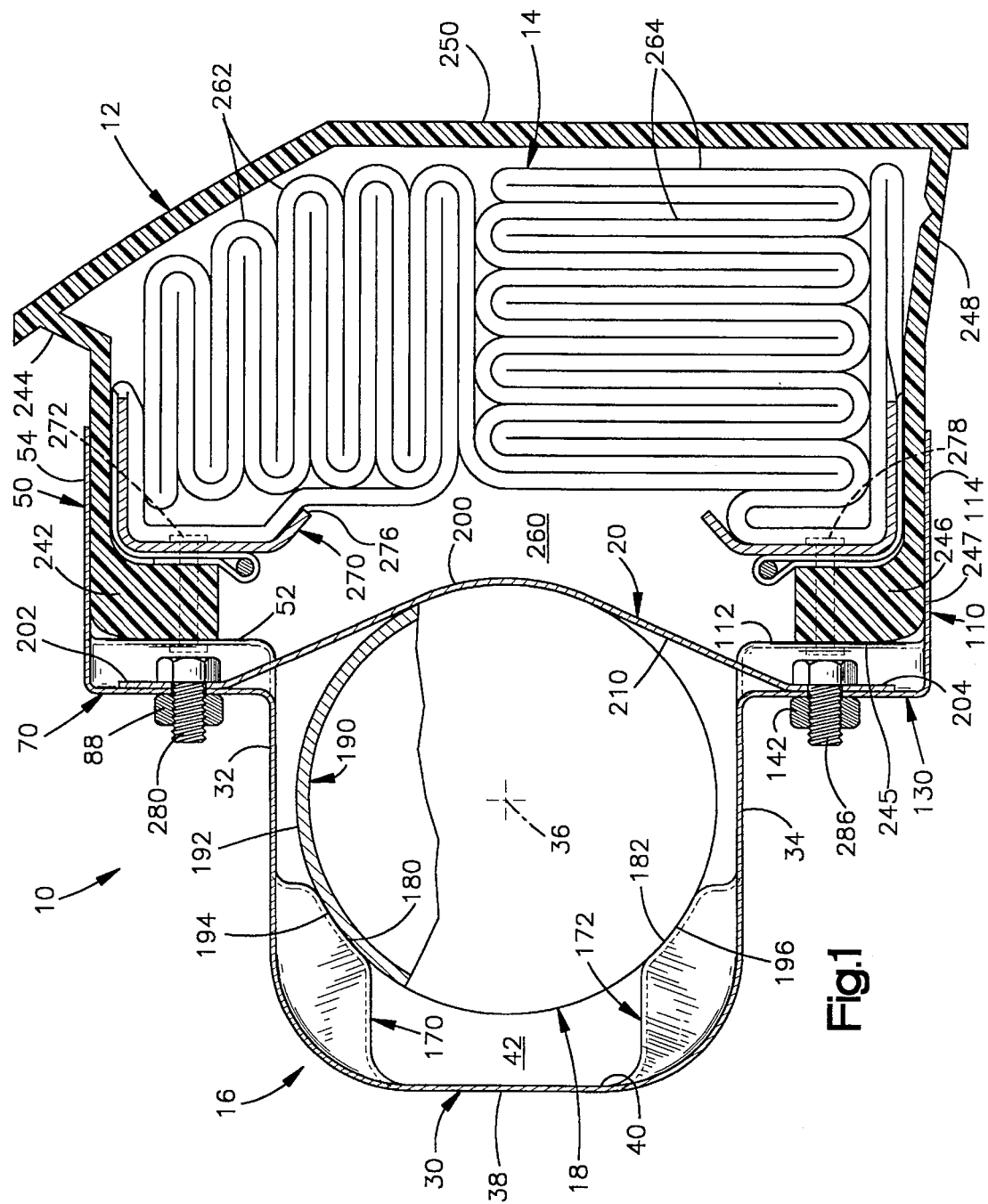
FIG. 1 is a schematic sectional view showing an air bag module in accordance with the present invention.

The present invention relates to an air bag module for protecting an occupant of a vehicle in the event of a vehicle emergency situation such as sudden vehicle deceleration. The present invention is applicable to various air bag module constructions. As representative of the present invention, FIG. 1 illustrates an air bag module 10.

Figure 2:
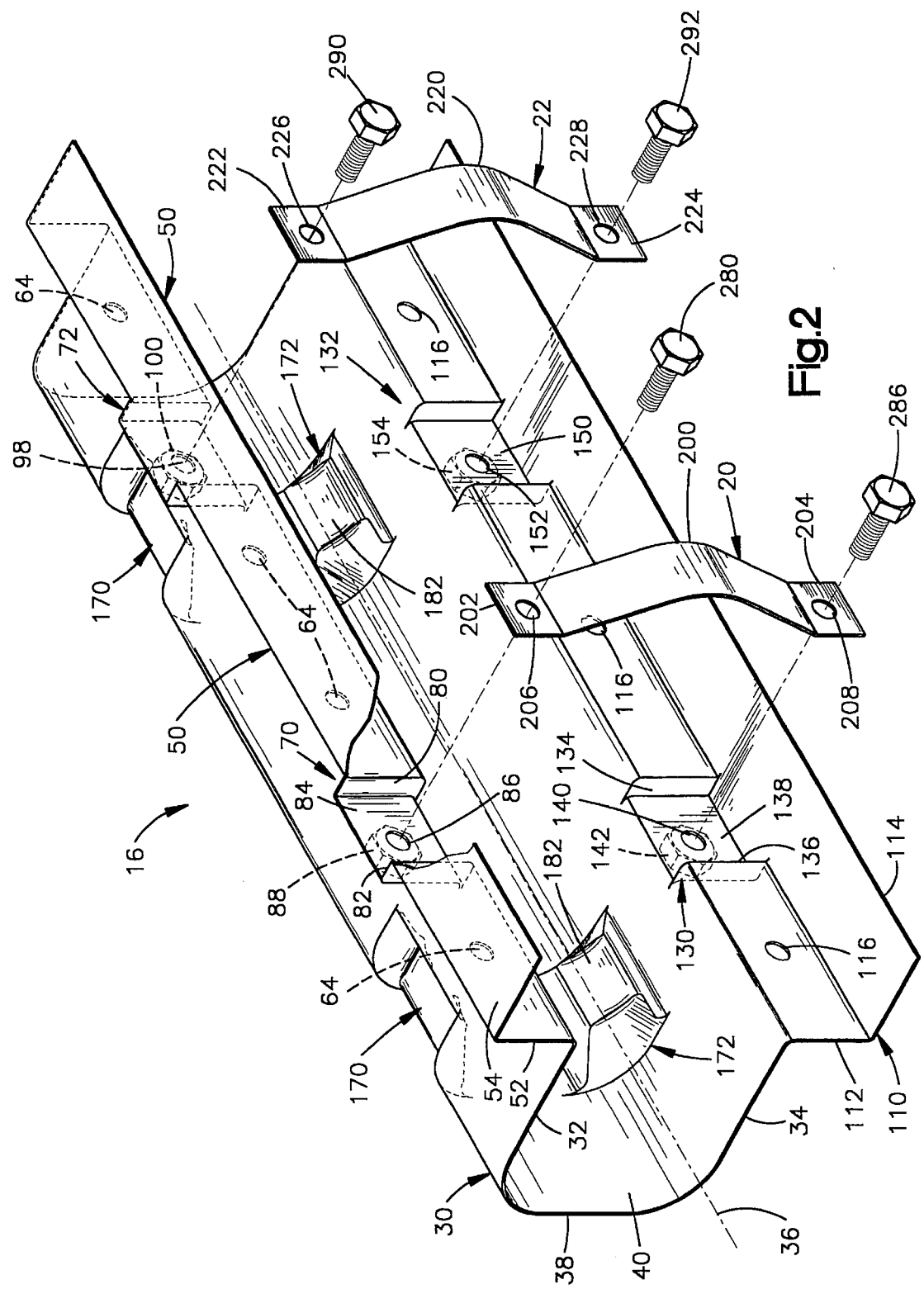
FIG. 2 is an exploded perspective view of a canister and straps included in the air bag module of FIG. 1.

The air bag module 10 includes a container 12 in which an air bag 14 is folded and stored. The air bag module 10 also includes a canister 16 to which the container 12 is attached, an inflator 18 for inflating the air bag 14, and a pair of straps 20 and 22 (FIG. 2) for securing the inflator in the canister.

The canister 16 (FIGS. 1 and 2) is made from a single piece of sheet metal stamped and formed to the illustrated configuration. The canister 16 includes a main wall 30 having a generally C-shaped cross-sectional configuration as seen in FIG. 1. The main wall 30 includes parallel upper and lower main wall portions 32 and 34 which extend parallel to a longitudinal central axis 36 of the canister 16. The main wall 30 further includes a back wall portion 38 which interconnects the upper wall portion 32 and the lower wall portion 34. The main wall 30 has an inner side surface 40 and defines a chamber 42 in the canister 16 for receiving the inflator 18.

Figure 4:
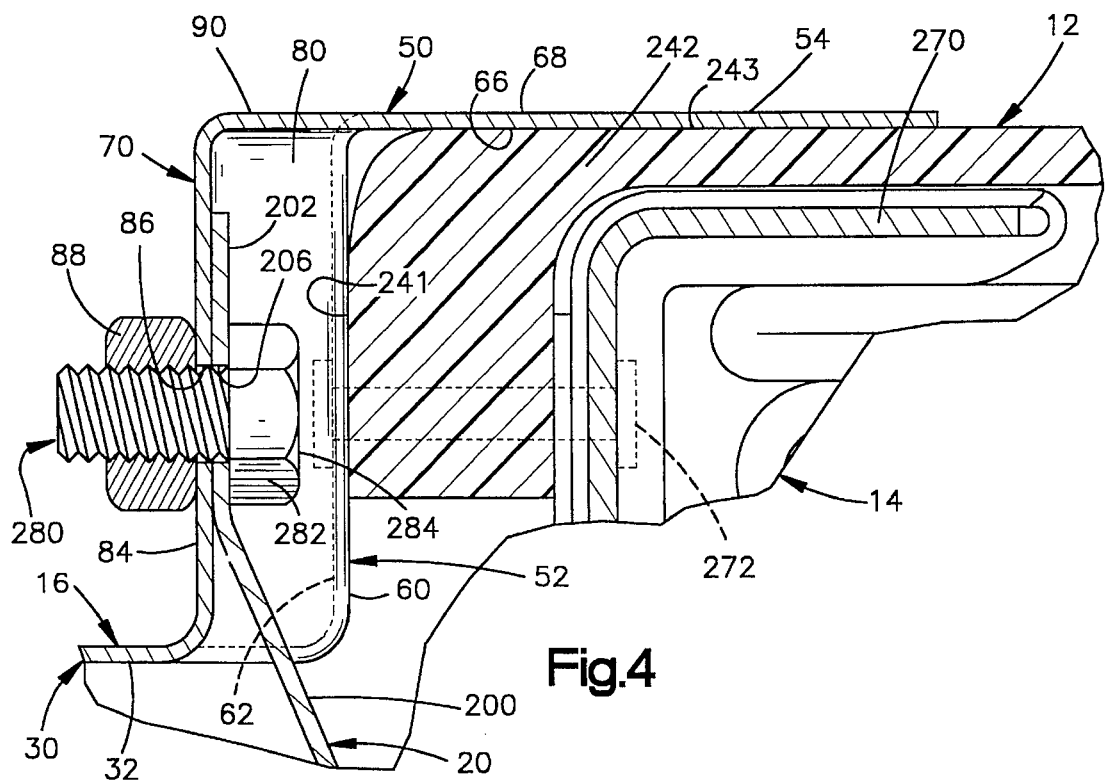
FIG. 4 is an enlarged view of a portion of the air bag module of FIG. 1.

The canister 16 includes a first upper flange 50 which projects away from the upper wall portion 32. The first upper flange 50 has an L-shaped cross-sectional configuration including planar first and second legs 52 and 54. The first leg 52 of the first upper flange 50 extends from the upper wall portion 32 parallel to the axis 36 and in a direction perpendicular to the upper wall portion. The first leg 52 of the first upper flange 50 has opposite first and second side surfaces 60 and 62 (FIG. 4). Four spaced apart upper container fastener openings 64 (FIG. 2) in the first leg 52 extend between the first and second side surfaces 60 and 62.

The second leg 54 of the first upper flange 50 extends from the first leg 52 parallel to the upper wall portion 32 and in a direction perpendicular to the first leg. The second leg 54 extends parallel to the axis 36 and has opposite first and second side surfaces 66 and 68 (FIG. 4).

The first upper flange 50 includes a pair of first recessed portions 70 and 72 (FIG. 2) which are formed in the first leg 52 of the first upper flange. The first recessed portion 70 includes parallel side walls 80 and 82 between which extends a back wall 84. The back wall 84 is spaced apart from and extends parallel to the plane of the first leg 52 of the first upper flange 50. A first upper strap fastener opening 86 extends through the back wall 84. A nut 88 is welded to the back wall 84 concentric with the opening 86. An upper wall portion 90 (FIG. 4) of the first recessed portion 70 is co-planar with the second leg 54 of the first upper flange 50.

Figure 3:
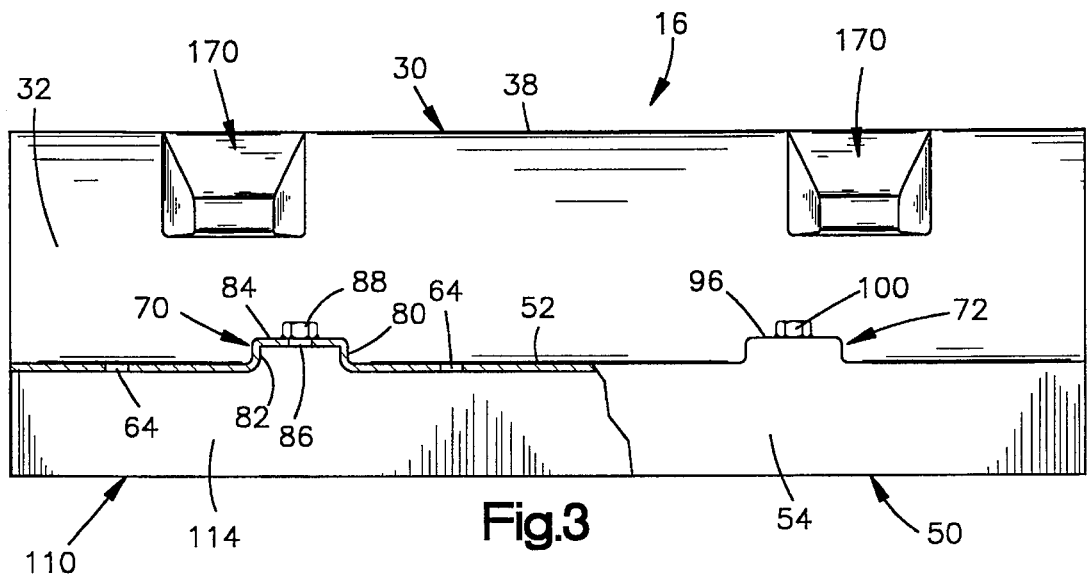
FIG. 3 is a top view, partially in section, of the canister of FIG. 2.

The first recessed portion 72 (FIGS. 2 and 3) in the first upper flange 50 is identical to the first recessed portion 70. The first recessed portion 72 includes a back wall 96 (FIG. 3) which is spaced apart from and extends parallel to the plane of the first leg 52 of the first upper flange 50. A second upper strap fastener opening 98 (FIG. 2) extends through the back wall 96. A nut 100 is welded to the first recessed portion concentric with the opening 98, The canister 16 includes a first lower flange 110 (FIGS. 1 and 2) which is a mirror image of the first upper flange 50. The first lower flange 110 projects away from the lower wall portion 34 of the canister 16 and away from the first upper flange 50. The first lower flange 110 has an L-shaped cross sectional configuration including planar first and second legs 112 and 114. The first leg 112 is co-planar with the first leg 52 of the first upper flange 50 and extends from the lower wall portion 34 parallel to the axis 36 and in a direction perpendicular to the lower wall portion. The first leg 112 of the first lower flange 110 has three spaced apart lower container fastener openings 116. The second leg 114 of the first lower flange 110 extends from the first leg 112 parallel to the lower wall portion 34 and to the axis 36 and in a direction perpendicular to the second leg.

The first lower flange 110 includes a pair of first recessed portions 130 and 132 (FIG. 2) which are identical to the first recessed portions 70 and 72 in the first upper flange 50. The first recessed portions 130 and 132 are formed in the first leg 112 of the first lower flange 110. The first recessed portion 130 includes parallel side walls 134 and 136. A back wall 138 extends between the side walls 134 and 136. The back wall 138 is spaced apart from and extends parallel to the plane of the first leg 112 of the first lower flange 110. A first lower strap fastener strap opening 140 extends through the back wall 138. A nut 142 is welded to the back wall 138 concentric with the opening 140.

The first recessed portion 132 in the first lower flange 110 includes a back wall 150 which is spaced apart from and extends parallel to the plane of the first leg 112 of the first lower flange. A second lower strap fastener opening 152 extends through the back wall 150 of the first recessed portion 132. A nut 154 is welded to the back wall 150 concentric with the opening 152.

The canister 16 has a plurality of second recessed portions 170 and 172 which form standoffs that project from the inner surface 40 of the main wall 30 into the chamber 42 in the canister. Two of the second recessed portions, that is, the second recessed portions 170, are disposed above the axis 36 as viewed in FIG. 1. The second recessed portions 170 are spaced apart axially from each other. Each second recessed portion 170 has a respective arcuate inner surface 180 (FIG. 1) which is presented toward the axis 36. The surfaces 180 on the second recessed portions 170 are spaced apart from each other.

The second recessed portions 172 of the canister 16 are disposed below the axis 36 as viewed in FIG. 1. The second recessed portions 172 are spaced apart axially from each other. Each of the second recessed portions 172 has a respective arcuate inner surface 182 which is presented toward the axis 36. The surfaces 182 are spaced apart from each other and are spaced apart from the surfaces 180 on the second recessed portions 170.

The inflator 18 is disposed in the chamber 42 in the canister 16. The inflator 18 may be any suitable known air bag inflator which is actuatable to supply inflation fluid under pressure to inflate the air bag 14. The inflator 18 includes a housing 190 (FIG. 1) having a cylindrical outer side surface 192.

The straps 20 and 22 (FIG. 2) are identical to each other and are each made from a single piece of sheet metal. The first strap 20 includes a central portion 200 which extends between opposite upper and lower end portions 202 and 204. The upper end portion 202 has a fastener opening 206. The lower end portion 204 has a fastener opening 208. The central portion 200 of the first strap 20 has a major side surface 210 (FIG. 1) which is presented toward the back wall portion 38 of the canister 16.

The second strap 22 (FIG. 2) includes a central portion 220 which extends between opposite upper and lower end portions 222 and 226. The upper end portion 222 has a fastener opening 226. A fastener opening 228 is formed in the lower end portion 224 of the second strap 22. The central portion 220 of the second strap 22 has a major side surface which is presented toward the back wall portion 38 of the canister 16.

The container 12 (FIG. 1) is a unitary structure molded from one piece of plastic and includes a second upper flange 242 which extends across the top of the container. The second upper flange 242 has first and second side surfaces 241 and 243 (FIG. 4). A hinge portion 244 (FIG. 1) of the container 12 extends from the second upper flange 242.

The container 12 further includes a second lower flange 246 which extends across the bottom of the container. The second lower flange 246 has first and second side surfaces 245 and 247 (FIG. 1). The second lower flange 246 includes a breakable portion 248 at which the container 12 is designed to break open when the air bag 14 inflates.

The container 12 includes a deployment door 250 which forms an outer wall of the container. In the illustrated embodiment, the deployment door 250 is disposed closest to the vehicle occupant when the air bag module 10 is mounted in the vehicle. Thus, the air bag 14 inflates generally in a direction to the right as viewed in FIG. 1. The deployment door 250 is connected with the hinge portion 244 of the container 12, to close the upper end of the container. The deployment door 250 is connected at its lower end with the breakable portion 248 of the container 12, to close the lower end of the container.

The air bag 14, when in the deflated, folded condition shown in FIG. 1, is disposed in a chamber 260 in the container 12. When the folded air bag 14 (FIG. 1) is in the container 12, a series of first folded portions 262 of the air bag lie generally horizontally in the container and are stacked from top to bottom in an upper portion of the chamber 260. The first folded portions 262 extend generally transverse to the deployment door 250. A series of second folded portions 264 of the air bag 14 extend generally vertically in the container 12 and are stacked from outside to inside (right to left as viewed in FIG. 1) in a lower portion of the chamber 260 of the container. The stack of second folded portions 264 is disposed below the stack of first folded portions 262 of the air bag 14. The second folded portions 264 extend generally parallel to the deployment door 250.

The air bag module 10 includes a retaining ring 270 (FIGS. 1 and 4) which is connected with the container 12. The retaining ring 270 defines an inflation fluid opening 276 adjacent to the inflator 18. The retaining ring 270 secures the air bag 14 to the container 12 to form an assembly which is connected with the canister 16 in a manner described below.

To assemble the air bag module 10, the inflator 18 is placed in the chamber 42 in the canister 16. The main wall 30 of the canister 16 partially encloses the inflator 18. Spaced apart portions 194 and 196 of the cylindrical outer surface 192 of the housing 190 of the inflator 18 are in abutting engagement with the inner surface portions 180 and 182 on the second recessed portions 170 and 172, respectively, of the canister 16.

The straps 20 and 22 are next assembled to the canister 16 to secure the inflator 18 in the canister. The upper end portion 202 (FIG. 4) of the first strap 20 is disposed in the first recessed portion 70 of the first upper flange 50 of the canister 16. A first upper strap fastener or bolt 280 extends through the fastener opening 206 in the upper end portion 202 of the first strap 20. The bolt 280 also extends through the fastener opening 86 in the back wall 84 of the first recessed portion 70 of the first upper flange 50 of the canister 16. The bolt 280 is screwed into the nut 88 on the canister 16 to secure the upper end portion 202 of the strap 20 to the canister 16.

The bolt 280 has a head portion 282 with an outer end surface 284. When the upper end portion 202 of the first strap 20 is secured to the canister 16, the head portion 282 of the bolt 280 is disposed in the first recessed portion 70 between the side walls 80 and 82. The outer end surface 284 of the bolt 280 is disposed between the plane of the first leg 52 of the first upper flange 50 and the plane of the back wall 84 of the first recessed portion 70. Thus, the head portion 282 of the first bolt 280 does not project beyond (that is, to the right of as viewed in FIGS. 1 and 4) the first leg 52 of the first upper flange 50.

The lower end portion 204 (FIG. 1) of the first strap 20 is disposed in the first recessed portion 130 of the first lower flange 110 of the canister 16. A first lower strap fastener or bolt 286 extends through the fastener opening 208 (FIG. 2) in the lower end portion 204 of the first strap 20. The bolt 286 also extends through the fastener opening 140 in the back wall 138 of the first recessed portion 130 of the first lower flange 110. The bolt 286 is screwed into the nut 142 on the first recessed portion 130 of the first lower flange 110 of the canister 16, to secure the lower end portion 204 of the strap 20 to the canister. The head of the bolt 286 does not project beyond (that is, to the right of as viewed in FIG. 1) the plane of the first leg 112 of the first lower flange 110 of the canister 16.

When the end portions 202 and 204 of the first strap 20 are secured to the canister 16, the central portion 200 of the first strap is in abutting engagement with the housing 190 of the inflator 18. The inner side surface 210 of the first strap 20 overlies the outer side surface 192 of the housing 190 of the inflator 18. The first strap 20 clamps the inflator 18 against the second recessed portions 170 and 172 of the canister 16.

The upper end portion 222 (FIG. 2) of the second strap 22 is disposed in the first recessed portion 72 of the first upper flange 50 of the canister 16. A second upper strap fastener or bolt 290 (FIG. 2) extends through the fastener opening 226 in the upper end portion 222 of the second strap 22. The bolt 290 also extends through the fastener opening 98 in the back wall of the first recessed portion 72 of the first upper flange 50 of the canister 16. The bolt 290 is screwed into the nut 100 on the canister 16 to secure the upper end portion 222 of the second strap 22 to the canister.

The lower end portion 224 of the second strap 22 is disposed in the first recessed portion 132 of the first lower flange 110 of the canister 16. A second lower strap fastener or bolt 292 extends through the fastener opening 228 in the lower end portion 224 of the second strap 22. The bolt 292 also extends through the fastener opening 152 in the back wall 150 of the first recessed portion 132 in the lower flange 110 of the canister 16. The bolt 292 is screwed into the nut 154 on the first recessed portion 132, to secure the lower end portion 224 of the second strap 22 to the canister 16.

When the end portions 222 and 224 of the second strap 22 are secured to the canister 16, the central portion 220 of the second strap is in abutting engagement with the housing 190 of the inflator 18. The inner side surface of the central portion 220 of the second strap 22 overlies the outer side surface 192 of the housing 190 of the inflator 18. The second strap 22, along with the first strap 20, clamps the inflator 16 against the second recessed portions 170 and 172 of the canister 16.

The container 12 and the air bag 14 are then secured to the canister 16 as shown in FIGS. 1 and 4. The first upper flange 50 on the canister 16 overlies the second upper flange 242 on the container 12. The first side surface 241 (FIG. 4) on the second upper flange 242 of the container 12 overlies the side surface 60 on the first leg 52 of the first upper flange 50 of the canister 16. The second side surface 243 on the second upper flange 242 of the container 12 overlies the side surface 66 on the second leg 54 of the first upper flange 50 of the canister 16. The second upper flange 242 of the container 12 covers the heads of the bolts 280 and 290.

The second lower flange 110 (FIG. 1) on the canister 16 overlies the second lower flange 246 on the container 12. The first side surface 245 on the second lower flange 246 of the container 12 overlies the first leg 112 of the first lower flange 110 of the canister 16. The second side surface 247 on the second lower flange 246 of the container 12 overlies the second leg 114 of the first lower flange 110 of the canister 16. The second lower flange 246 of the container 12 covers the heads of the bolts 286 and 292.

Four upper container fasteners 272, which are preferably rivets, extend through the retaining ring 270 and through the second upper flange 242 of the container 12. The upper container fasteners 272 also extend through the fastener openings 64 in the first leg 52 of the first upper flange 50 of the canister 16. Three lower container fasteners 278, which are preferably rivets, extend through the retaining ring 270 and through the second lower flange 246 of the container 12. The rivets 278 extend through the fastener openings 116 in the first leg 112 of the first lower flange 110 of the canister 16. The lower container fasteners 278, together with the upper container fasteners 272, secure the container 12 and the air bag 14 to the canister 16.

Upon the occurrence of a vehicle emergency situation requiring inflation of the air bag 14 to help protect a vehicle occupant, such as vehicle deceleration exceeding a predetermined deceleration, the inflator 16 is actuated in a known manner to direct inflation fluid into the deflated, folded air bag 14. The air bag 14 unfolds and inflates. As the air bag 14 unfolds and inflates, it moves in a direction to the right as viewed in FIG. 1, toward the vehicle occupant. The inflating air bag 14 contacts the deployment door 250. As the force exerted by the inflating air bag 14 increases, the container 12 breaks at the breakable portion 248. The deployment door 250 pivots outwardly and upwardly about the hinge portion 244 to an open position (not shown) as the air bag 14 inflates completely. The inflated air bag 14 protects the vehicle occupant and restrains movement of the vehicle occupant.

From the above description of the invention, those skilled in the art will perceive improvements, changes and modifications in the invention. For example, the canister 16 need not be a separate component but could be defined by other portions of the vehicle such as portions of the vehicle instrument panel. Such improvements, changes and modifications within the skill of the art are intended to be covered by the appended claims.

Having described the invention, we claim:

1. A safety apparatus for protecting an occupant of a vehicle, said apparatus comprising:

an inflatable vehicle occupant restraint having a deflated condition and an inflated, occupant protecting condition;

an inflator for inflating said inflatable restraint, said inflator having a housing;

a canister defining a chamber for receiving said housing;

said canister having a main wall including upper and lower main wall portions and having first upper and lower flanges projecting away from said upper and lower main wall portions, respectively, and away from each other;

each one of said first upper and lower flanges having a pair of first recessed portions;

said canister having a plurality of second recessed portions forming standoffs which project into said chamber and which define spaced surfaces for engaging spaced surface portions of said housing;

a pair of straps, each one of said straps having an upper end portion located in one of said first recessed portions on said first upper flange and a lower end portion located in one of said first recessed portions on said first lower flange;

said straps clamping against said inflator housing to clamp said surface portions of said inflator housing against said surfaces on said standoffs; and fasteners located in said first recessed portions for securing said straps to said canister.

2. A safety apparatus as set forth in claim 1 wherein each one of said first upper and lower flanges of said canister has an L-shaped configuration including first and second legs, said first recessed portions being formed in said first legs of said first upper and lower flanges.

3. A safety apparatus as set forth in claim 2 wherein each one of said first legs of said first upper and lower flanges has a planar configuration, said fasteners being recessed from the planes of said first legs of said first upper and lower flanges.

4. A safety apparatus as set forth in claim 3 wherein said end portions of said straps are recessed from the planes of said first legs of said first upper and lower flanges.

5. A safety apparatus as set forth in claim 1 wherein said fasteners comprise bolts having heads which are disposed in said first recessed portions of said first upper and lower flanges.

6. A safety apparatus as set forth in claim 1 wherein said main wall of said canister at least partially encloses said inflator and has an inner side surface presented toward said inflator, said second recessed portions of said canister projecting from said inner side surface of said main wall in a direction toward said inflator.

7. A safety apparatus as set forth in claim 6 wherein said main wall has a generally C-shaped configuration including a back wall portion and said upper and lower main wall portions, said second recessed portions projecting from said back wall portion of said main wall.

8. A safety apparatus as set forth in claim 1 wherein said first recessed portions on said first upper flange of said canister are spaced apart axially from each other, said first recessed portions on said first lower flange of said canister being spaced apart axially from each other, said straps being spaced apart axially from each other.

9. A safety apparatus as set forth in claim 1 further comprising:

a unitary structure defining a chamber in which said inflatable restraint is located when in the deflated condition, said unitary structure including a deployment door which opens as said inflatable restraint is inflated to enable said inflatable restraint to move into the inflated, occupant protecting condition, said unitary structure having second upper and lower flanges which overlie said first upper and lower flanges; and fastener means for securing said second upper and lower flanges to said first upper and lower flanges.

10. A safety apparatus as set forth in claim 9 wherein said second upper flange of said unitary structure has a first side surface which overlies a first side surface of said first upper flange of said canister and has a second side surface which overlies a second side surface of said first upper flange of said canister.

11. A safety apparatus for protecting an occupant of a vehicle, said apparatus comprising:

an inflatable vehicle occupant restraint having a deflated condition and an inflated, occupant protecting condition;

an inflator for inflating said inflatable restraint, said inflator having a housing;

a canister defining a chamber for receiving said housing;

said canister having a main wall including upper and lower main wall portions and having first upper and lower main flanges projecting away from said upper and lower main wall portions, respectively, and away from each other;

each one of said first upper and lower flanges having a pair of first recessed portions;

said canister having a plurality of second recessed portions forming standoffs which project into said chamber and which define spaced surfaces for engaging spaced surface portions of said housing; and securing means for clamping said surface portions of said inflator housing against said surfaces on said standoffs, said securing means being in engagement with said inflator housing and having portions located in said first recessed portions on said first upper and lower flanges.

12. A safety apparatus as set forth in claim 11 wherein said securing means comprises a plurality of straps each having an upper end portion located in one of said first recessed portions on said first upper flange, a lower end portion located in one of said first recessed portions on said first lower flange, and a central portion in abutting engagement with said inflator housing.

13. A safety apparatus as set forth in claim 12 wherein each strap upper end portion includes an upper fastener opening, said securing means further comprising a plurality of upper fasteners extending through said fastener openings in said upper end portions of said straps and through wall portions of said first recessed portions on said first upper flange, each strap lower end portion including a lower fastener opening, said securing means further comprising a plurality of lower fasteners extending through said fastener openings in said lower end portions of said straps and through wall portions of said first recessed portions on said first lower flange.

14. A safety apparatus as set forth in claim 11 wherein each one of said first upper and lower flanges of said canister has an L-shaped configuration including first and second legs, said first recessed portions being formed in said first legs of said first upper and lower flanges, each one of said first legs of said first upper and lower flanges having a planar configuration, said portions of said securing means being recessed from the planes of said first legs of said first upper and lower flanges.

15. A safety apparatus as set forth in claim 11 further comprising:

a unitary structure defining a chamber in which said inflatable restraint is located when in the deflated condition, said unitary structure including a deployment door which opens as said inflatable restraint is inflated to enable said inflatable restraint to move into the inflated, occupant protecting condition, said unitary structure having second upper and lower flanges which overlie said first upper and lower flanges; and fastener means for securing said second upper and lower flanges to said first upper and lower flanges.

16. A safety apparatus for protecting an occupant of a vehicle, said apparatus comprising:

an inflatable vehicle occupant restraint having a deflated condition and an inflated, occupant protecting condition;

an inflator for inflating said inflatable restraint, said inflator having a housing;

a canister defining a chamber for receiving said housing;

said canister having a main wall including upper and lower main wall portions and having first upper and lower flanges projecting away from said upper and lower main wall portions, respectively, and away from each other;

each one of said first upper and lower flanges having a pair of first recessed portions;

said canister having a plurality of second recessed portions forming standoffs which project into said chamber and which define spaced surfaces for engaging spaced surface portions of said housing;

a pair of straps, each one of said straps having an upper end located in one of said first recessed portions on said first upper flange and a lower end located in one of said first recessed portions on said first lower flange;

said straps clamping against said inflator housing to clamp said surface portions of said inflator housing against said surfaces on said standoffs;

fasteners located in said first recessed portions for securing said straps to said canister;

a unitary structure defining a chamber in which said inflatable restraint is located when in the deflated condition, said unitary structure including a deployment door which opens as said inflatable restraint is inflated to enable said inflatable restraint to move into the inflated, occupant protecting condition, said unitary structure having second upper and lower flanges which overlie said first upper and lower flanges; and fastener means for securing said second upper and lower flanges to said first upper and lower flanges.

17. A safety apparatus as set forth in claim 16 wherein said second upper flange of said unitary structure has a first side surface which overlies a first side surface of said first upper flange of said canister and has a second side surface which overlies a second side surface of said first upper flange of said canister.

18. A safety apparatus as set forth in claim 16 wherein said second upper flange of said unitary structure is connected with an upper end portion of said deployment door and said second lower flange of said unitary structure is connected with a lower end portion of said deployment door.

19. A safety apparatus as set forth in claim 16 wherein said fasteners for securing said straps to said canister comprise bolts which are screwed into nuts welded on said first upper and lower flanges of said canister, said second upper and lower flanges of said unitary structure covering said heads of said bolts when said fastener means secures said second upper and lower flanges to said first upper and lower flanges.

20. A safety apparatus as set forth in claim 16 wherein each one of said first upper and lower flanges of said canister has an L-shaped configuration including first and second legs, said first recessed portions being formed in said first legs of said first upper and lower flanges, said fasteners and said end portions of said straps being recessed from said first legs of said first upper and lower flanges.

* * * * *